Feb. 11, 1964  E. P. BULLARD III, ET AL  3,120,762
MACHINE CONTROL
Filed Oct. 21, 1960  4 Sheets-Sheet 1

INVENTORS.
EDWARD P. BULLARD III
BY EDWARD P. BULLARD IV

ATTORNEY.

Feb. 11, 1964     E. P. BULLARD III, ET AL     3,120,762
MACHINE CONTROL
Filed Oct. 21, 1960     4 Sheets-Sheet 2
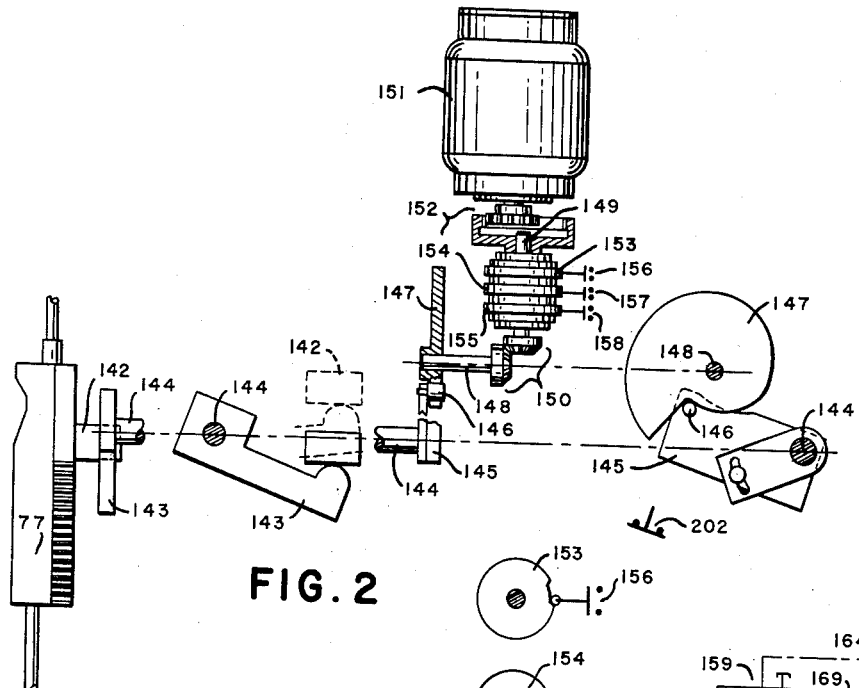
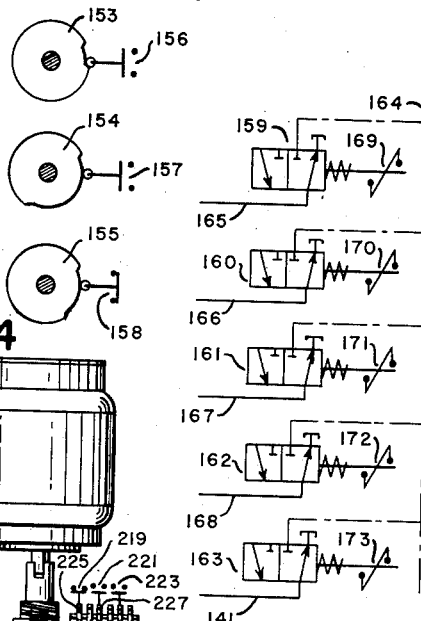
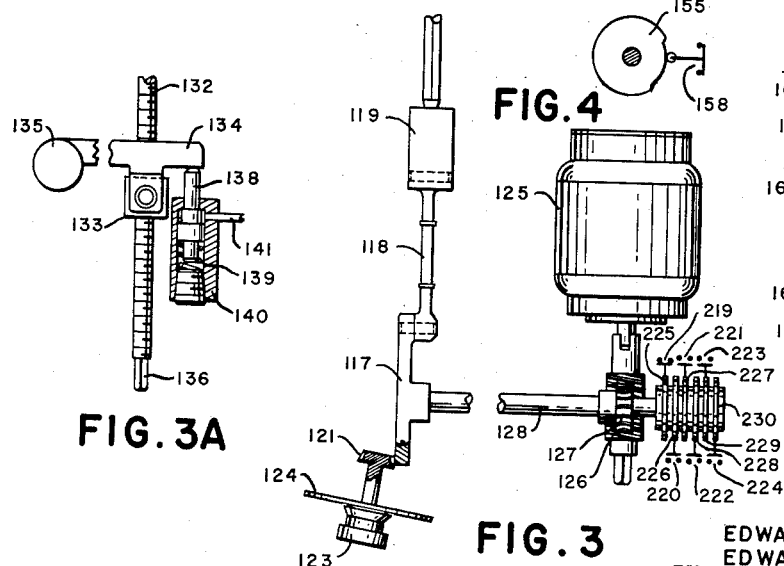
INVENTORS.
EDWARD P. BULLARD III
EDWARD P. BULLARD IV
BY
ATTORNEY.

Feb. 11, 1964  E. P. BULLARD III, ET AL  3,120,762
MACHINE CONTROL
Filed Oct. 21, 1960
4 Sheets-Sheet 3
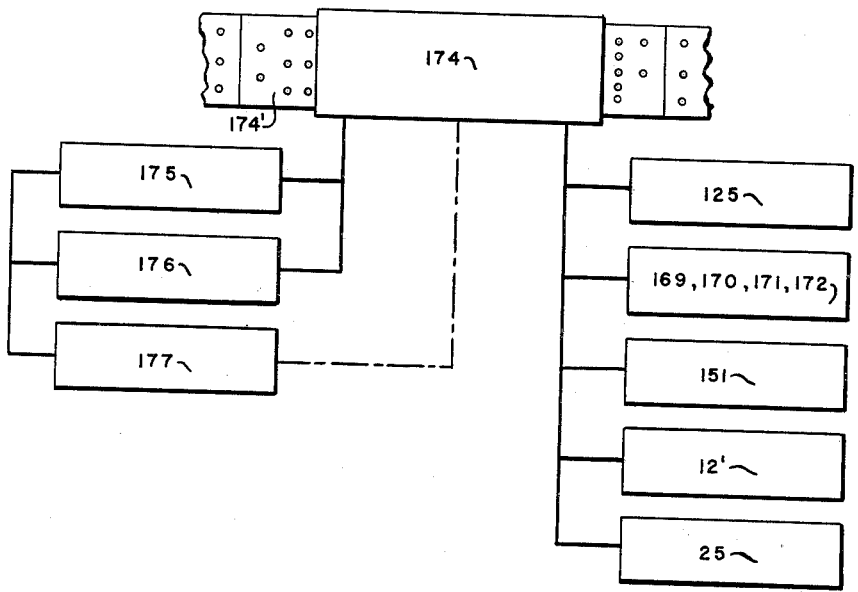
FIG. 8
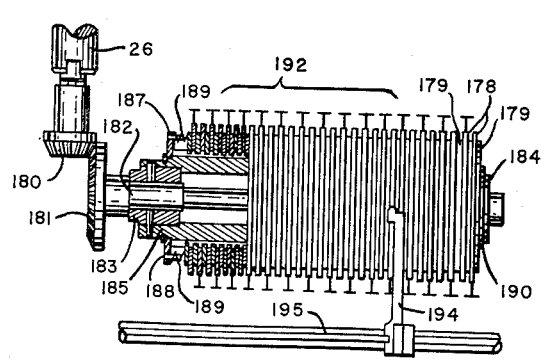
FIG. 6
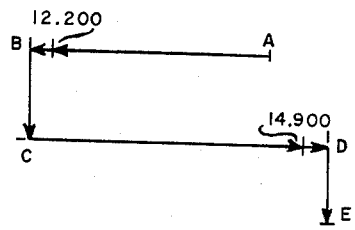
FIG. 9
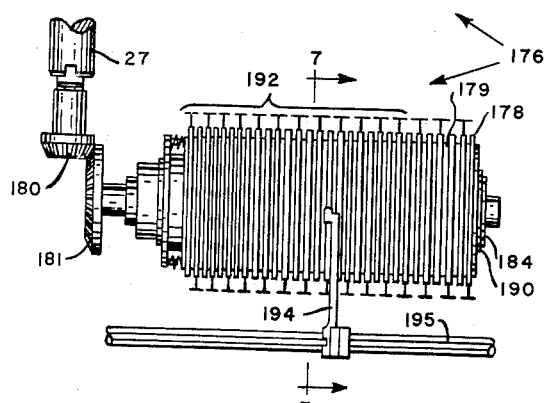
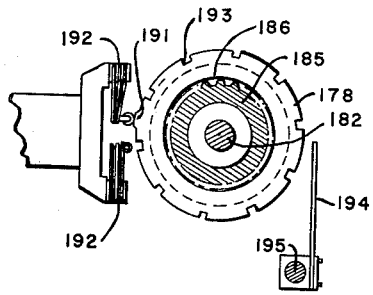
FIG. 7
INVENTORS.
EDWARD P. BULLARD III
BY EDWARD P. BULLARD IV
ATTORNEY.

United States Patent Office 3,120,762
Patented Feb. 11, 1964

3,120,762
MACHINE CONTROL
Edward P. Bullard III, Cherry Lane, and Edward P. Bullard IV, 220 Birch Road, both of Fairfield, Conn.
Filed Oct. 21, 1960, Ser. No. 64,188
16 Claims. (Cl. 74—365)

The present invention relates to automatic controls for machine involving one or more members that are movable along one or more paths of motion, and particularly to a new and improved programming control for such machines.

By "programming control" is meant the provision of a device that has preset data thereon for commanding the member or members to move along a preselected path or paths at a preselected rate of speed for a preselected distance. The device may also include other auxiliary data incident to the operation of the machine involving the movable members. Such controls may take the form of that shown in U.S. Patent 2,575,792 in which a rigid function selecting drum is employed that is indexed in a step-by-step fashion. It may also take the form of numerical tape control apparatus wherein a flexible tape may be employed that contains blocks of information data for commanding the movement of a movable member, such as the numerical tape controls currently being employed in the machine tool field.

Aside from the problems of tool setting, the employment of the above described controls provides satisfactory results where the movable member performs no machining work while it is moving, i.e., in moving a piece of work to position it relative to a tool, after which the tool performs a working operation on the piece. However, where machining work is performed while the tool is being moved from one location to another, or vice versa, problems arise with the use of such controls in that the control is incapable of anticipating variable conditions that may arise during the controlled movement of the movable member. Variations in metal density, hard spots and tool wear, as well as other variables that arise in the machining of metal cannot be anticipated by preset data in the control device.

Elaborate, sophisticated systems have been proposed to overcome such deficiencies of present controls, but their cost and maintenance have prevented any wide acceptance in the market.

The principal object of this invention is to provide a programming control in which a relatively simple, unsophisticated electronic distance determining apparatus is combined with adjustable mechanical distance control means of relatively simple construction and great accuracy for overcoming the deficiencies of presently known programming apparatus.

Another object of the invention is to provide such a control wherein the accuracy of the electronic distance determining mechanism is of a lower order than that of many of the known systems but still sufficiently accurate for the majority of functions encountered in the machine tool field.

Still another object of the invention is to provide such a control in which the electronic distance determining means is employed for all functions and in those cases where critical accuracy is required, the mechanically adjustable control means takes over for final distance determining.

Although the principles of the invention are applicable to any machine having one or more members movable along one or more paths, it has been shown and will be described as applied to a lathe having a variable speed feedworks transmission of the type shown, described and claimed in patent application Serial No. 37,677, filed June 21, 1960, and now Patent No. 3,028,768, in the name of Edward P. Bullard III, to which application reference is made for details not specifically described herein.

In one aspect of the invention, the feedworks transmission that controls the path, direction and rate of movement of the tool head may include separate driven shafts for each path of movement of the tool head, and separate groups of disks may be connected to each of these shafts. Each disk may be independently adjusted relative to all others, and may include a dog for tripping an electrical switch in a circuit that controls clutches within the feedworks transmission for stopping the movement of the tool head.

In another aspect of the invention, programming apparatus may comprise any one of the well known systems including punched tape, cards and the like which is indexed step by step through a tape reader that translates the punched data into commands which operate contacts to energize solenoids for effecting the functioning of the machine. Operating in conjunction with the punched tape, cards and the like may be a distance determining device that may be responsive to numerical data on the punched tape. This device may be any one of many known types including those in which numerical data on the tape sets up a condition wherein an error signal voltage is caused to be nullified in response to the tool head movement, and the indexing of a block of the tape through the tape reader occurs when said null condition is achieved.

In still another aspect of the invention, an electrical circuit may be provided which includes tape controlled contacts for causing the machine to operate in a predetermined manner. This circuit may be so arranged that when a non-critical dimension is required, only the electronic nulling circuit is rendered effective, and when a required dimension is critical, a presettable disk is employed to de-energize that portion of the circuit that controls the stopping of the movable tool head or member.

The above, other objects and novel features of the invention will become apparent from the following specification and accompanying drawings which are merely exemplary.

In the drawings:

FIG. 2 is a schematic view of certain of the components forming the control for the apparatus shown in FIG. 1;

FIG. 3 is a schematic view of certain other components forming the control for the apparatus shown in FIG. 1;

FIG. 3A is a detail of the control;

FIG. 4 is a showing of certain cam arrangements of the control;

FIG. 5 is a partial wiring diagram of a detail of the control;

FIG. 6 is a view of the mechanically adjustable distance determining means that is employed when critical dimensions are required;

FIG. 7 is a sectional view taken substantially along line 7—7 of FIG. 6;

FIG. 8 is a block diagram of the various components of the invention;

FIG. 9 is a diagram of a program of movements of a tool head as controlled by the principles of the invention.

Figure 1:
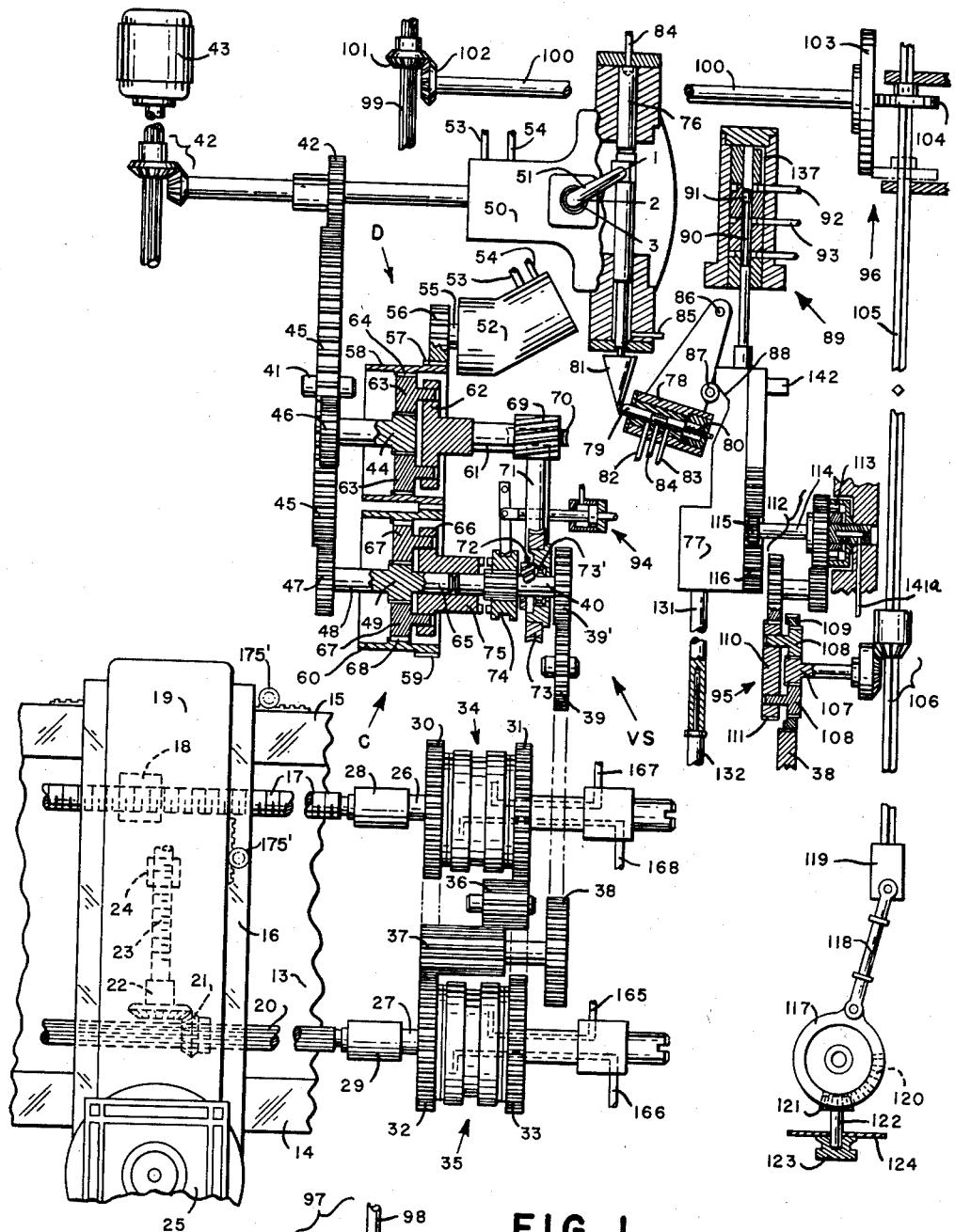
FIG. 1 is a front elevational view of a portion of a machine tool to which a schematic showing of the principles of the invention are applied.

Referring to FIG. 1, the principles of the invention are shown as applied to a lathe, in which only those elements are shown that are necessary to an understanding of the invention. A work supporting table 10 may include a bevel gear 11 fixed to it that may be driven by a bevel pinion 12. The bevel pinion 12 may be driven at different rates of speed by variable speed means 12' which per se forms no part of this invention. This variable speed means may be of the conventional gear shifting type or otherwise. A base (not shown) may support the table 10 as well as a cross rail 13 in position relative to said table to permit one or more tool holders to be moved into engagement with work held on the table 10. The cross rail 13 may include ways 14, 15 along which a saddle 16 may be reciprocated by the rotation of a screw 17 that cooperates with a non-rotatable nut 18 fixed to the back of saddle 16. A tool slide 19 may be mounted on the saddle 16 for reciprocating movement along ways on saddle 16 at right angles to the ways 14, 15. This may be accomplished by the provision of a rotatable splined shaft 20 on which a bevel pinion 21 is splined. The pinion 21 may be mounted for rotation on, and within a cored-out portion of the saddle 16, and may mesh with a corresponding bevel pinion 22 that is likewise mounted for rotation on the saddle 16. The pinion 22 may be fixed to a rotatable screw 23 that is threaded into a nut 24 that is fixed to the slide 19. From the foregoing it is evident that rotation of screw 17 in both directions will cause reciprocation of saddle 16 and with it slide 19 along ways 14, 15 of cross rail 13. And, rotation of splined shaft 20 in both directions will cause reciprocation of slide 19 along a path at right angles to the ways 14 and 15. The slide 19 may support a tool holder 25 to which tools can be fixed for cooperation with work held on the table 10.

The rotation of screw 17 and splined shaft 20 in both directions may be effected by the transmission of power through a feed bracket including parallel shafts 26 and 27 that, respectively, may be connected to screw 17 and splined shaft 20 by couplings 28 and 29. The shafts 26 and 27 may support two gears each, 30, 31, 32 and 33, for free rotation. A fluid-operated clutch 34 may be located between gears 30 and 31 to selectively connect either to shaft 26; and, a similar clutch 35 may be located between gears 32 and 33 to selectively connect gears 32 and 33 to shaft 27.

A pair of elongated overlapping and intermeshing gears 36 and 37 may be mounted in such a manner relative to gears 30, 31, 32 and 33 that gears 30 and 32 mesh with gear 37, while gears 31 and 33 may mesh with gear 36. Gears 30 and 33 are shown in a stretch-out, unmeshing position for clarity. From the foregoing it is evident that the rotation of gear 37 will cause gears 30 and 32 to rotate in the same direction, and by virtue of gear 36, will cause gears 31 and 33 to also rotate in the same direction but reversely relative to the rotation of gears 30 and 32. Accordingly, shifting of clutch 34 between its limits of motion will cause rotation of screw 17 in both directions; and shifting of clutch 35 between its limits of motion will cause rotation of splined shaft 20 in both directions.

Power may be supplied to the gear 37 through gears 38 and 39, the latter of which may be connected to a gear 39' fixed to the output shaft 40 of a variable speed transmission VS.

Referring to FIG. 1, an input shaft 41 having a gear 45 fixed thereto may be connected by suitable means such as gearing 42 to a prime mover such, for example, as a constant speed A.C. motor 43. The input shaft 41 may be connected to a first element of an epicyclic gearing arrangement D located in one path of power flow. In the embodiment disclosed, the shaft 41 is shown as connected to a sun gear 44 through gearing 45 and 46, although it is evident that any one of the three power transmitting elements of the epicyclic gearing arrangement D could have been selected.

Spur gearing including gears 45 and 47 are shown as driving a shaft 48 from shaft 41 in the same direction as gear 46 is driven from shaft 41, although the direction of rotation of shaft 48 relative to gear 46 is immaterial as will be explained hereinafter. The shaft 48 is connected to a first element of another epicyclic gearing arrangement C located in another path of power flow. While the shaft 48 may be connected to any one of the three power transmitting elements of the arrangement C, it is shown as being connected to a sun gear 49 thereof.

The motor 43 is also connected directly to a positive displacement variable volume hydraulic unit 50, the variable displacement of which can be changed by the movement of a lever 51 between two limiting positions at which the unit 50 delivers liquid under pressure at maximum capacity in opposite directions of flow. When the lever 51 is at its midpoint of movement, no fluid is delivered by the unit 50.

The unit 50 may be of any positive displacement variable capacity type and it may be connected to a positive displacement non-variable hydraulic unit 52 within a closed circuit including lines 53 and 54. The unit 52 may be connected to a shaft 55 that supports a gear 56 in mesh with a gear 57 mounted on a second element 58 of the epicyclic gearing arrangement D. Gear 57 may mesh with a gear 59 on a second element 60 of the epicyclic gearing arrangement C.

From the foregoing it is evident that the hydraulic units 50 and 52 comprise a variable speed device that is connected to a second element of each of the epicyclic arrangements D and C. While a hydraulic steplessly variable speed device driven from the motor 43 has been disclosed, it is to be understood that the variable speed device need not be of the stepless variety, of the hydraulic type, nor be driven by the motor 43. It may comprise any form of variable speed device that can be adjusted in two directions throughout its range of speed variation. It may be driven by an external source of power, although when so driven, under certain circumstances a loss of feedback power is experienced which latter can be utilized to advantage to a certain degree and under certain conditions of operation when the variable speed device is driven from the input shaft 41.

The second elements 58 and 60 of the arrangements C and D are shown as being rotated in opposite directions, but this is only exemplary and not to be considered as a limitation. The only reservation is that rotation of the first and second elements of each of the arrangements C and D should be such that as the variable speed device 50, 52 is operated to increase or decrease in speed, the speed of rotation of the third power transmitting element of one of the arrangements C or D increases while the speed of the third element of the other decreases.

In the embodiment disclosed, the third element of the arrangement D may comprise a shaft 61 having an arm 62, to each of the outer ends of which a planet gear 63 is journaled. The planet gears 63, of course, mesh with the sun gear 44 as well as internal gear teeth 64 of the second element 58 of the arrangement D.

The third element of the C arrangement may comprise a shaft 65 similar to shaft 61 and having an arm 66 journaling planet gears 67 that mesh with the gear 49 and the internal gear teeth 68 on the second element 60.

Dissimilar ratio gearing may be provided between the shafts 61, 65 and the output shaft 40. This gearing may comprise worm 69 fixed to shaft 61 that meshes with a worm gear 70 fixed to a shaft 71; a worm 72 fixed to shaft 71 may mesh with a worm gear 73 mounted on shaft 40 with an overriding clutch 73' therebetween for a purpose to be described later. A clutch element 74 may be splined to shaft 40 and it may cooperate with clutch engaging means on a clutch element 75 fixed to shaft 65 in a manner presently to be described.

The hydraulic unit 50 is adapted to drive shaft 55 at a maximum speed in one direction at a 1:1 ratio, when its lever 51 is in the number 1 position, and to drive shaft 55 at a maximum speed in the opposite direction at a 1:1 ratio when lever 51 is in its number 3 position. When lever 51 is in its number 2 position, shaft 55 is not driven by unit 50. With the shaft 55 rotating at a maximum speed in either direction, the reactors 58 and 60 are rotating in opposite directions at maximum speed. Since the sun gears 44 and 49 are rotating in the same direction, it is evident that the shaft 61 or 65 of the epicyclic gearing arrangements D or C, the reactor of which is rotating oppositely to its sun gear, will rotate at a speed below base speed of its corresponding arrangement, while the other shaft of the two will be rotating at a speed above base speed. Assuming that the arrangement D is the one in which its reactor 60 rotates oppositely to its sun gear 44 when lever 51 is in its number 1 position, if the proper gear ratios and the proper speed of shaft 55 are employed, shaft 61 can be standing still when reactor 60 is rotating at the proper speed incident to lever 51 being in its number 1 position.

With clutch 74 in the position shown in FIG. 1, and moving lever 51 toward its number 2 position, the speed of shaft 40 will increase, through the action of overriding clutch 73', steplessly from zero to a speed coincident with the lever 51 arriving at its number 2 position where reactor 58 is stopped and shaft 61 is rotating at the base speed of the arrangement D. Continued movement of lever 51 toward its number 3 position causes reactor 58 to increase in speed from zero, but in a direction reversely to that in which it was rotating during the period when lever 51 was moved from its number 1 to its number 2 position. Expressed differently, reactor 58 now rotates in the direction of its sun gear 44. This, of course, causes shaft 61 and shaft 40 to increase in speed to a maximum for the transmission of power through the D epicyclic gearing arrangement.

When lever 51 is at its number 3 position, the reactor 60 is rotating in a direction opposite to its sun gear 49 and at a maximum speed so that shaft 65 is rotating at a speed below the base speed of the epicyclic gearing arrangement C. By employing the proper gear ratio between shaft 61 and shaft 40, the speed of shaft 54 can be slightly greater than the speed of shaft 40 when lever 51 is in its number 3 position so that clutch 74 can be shifted into engagement with clutch element 75 without tooth-on-tooth engagement, the overriding clutch permitting shaft 40 to be rotated at the slightly greater speed of shaft 65.

Movement of lever 51 from its number 3 position to its number 2 position causes reactor 60 to decrease in speed to a stopped condition and consequently causes a stepless increase in speed of shaft 65 and shaft 40. Movement of lever 51 to its number 1 position, of course, reverses the rotation of reactor 60, causing the speed of shafts 65 and 40 to continue to increase to the top limit of the epicyclic gearing arrangement C.

By employing a relatively high gear ratio between shaft 61 and shaft 40, and a direct connection between shaft 65 and shaft 40, during initial movement of lever 51 from its number 1 position to its number 3 position and with clutch 74 in neutral, the speed of shaft 40 can be steplessly varied over a relatively small range of speeds, i.e., speeds from 0 to about 23 r.p.m. And, during movement of lever 51 from its number 3 position to number 1 position with clutch 74 clutched to element 75, the speed of shaft 40 may be steplessly varied from 23 r.p.m. to about 950 r.p.m. Accordingly, the low range of 0 to 23 r.p.m. as well as the lower end of the high range may be utilized for feed movements of the tool, and the range of 0 to 950 r.p.m. may be utilized for traverse speeds of the tool. These speeds of shaft 40 are merely one example that results from the selection of certain gear ratios. It is, of course, understood that any desired low and high speed range can be achieved by the proper selection of gear ratios.

Referring to FIG. 1, in order to control the flow of power through the variable speed transmission VS, means may be provided for moving the lever 51 between its various positions. In the embodiment disclosed, this means may comprise a reciprocable piston 76 that is connected to the lever 51. The movement of piston 76 may be effected by a servomechanism including a reciprocable cam 77 and a servo valve 78. The servo valve may include a spool 79 that is resiliently urged by a spring 80 into engagement with a cam 81 fixed to the one end of piston 76. Constant pressure and exhaust lines 82 and 83 are connected to the valve 78 such that the spool 79 blocks both when in its normal position or the position to which it returns after being displaced. Another line 84 is connected to valve 78 between the lines 82 and 83. Line 84 leads to the top of piston 76. A constant pressure line 85 continuously acts on piston 76 tending to return it to the position shown in FIG. 1; however, the area of piston 76 acted upon by pressure fluid from line 85 is less than that acted upon by pressure fluid from line 84 so that the latter overcomes the former when it is effective.

The valve 78 may be pivotally mounted at 86 and it may include a cam roller 87 that follows a cam surface 88 on cam 77. With the parts in the condition shown in FIG. 1, the lever 51 is in its number 1 position, and the units 50 and 52 are rotating at maximum speed in one direction. Movement of the cam 77 upwardly will cause the valve 78 to pivot counterclockwise about pivot 86 by the action of spring 80 expanding. This causes spool 79 to move leftwardly, establishing communication between lines 82 and 84 while maintaining exhaust line 83 closed. Accordingly, pressure liquid in line 84 forces piston 76 downwardly, moving arm 51 from its number 1 position toward its number 2 position until cam 81 forces spool 79 rightwardly to cut off communication between lines 82 and 84, at which point the pressure liquid within line 84 and above piston 76 is trapped, holding piston 76 and arm 51 in its new position.

As previously described, this causes the speed of the reactor 58 to decrease and that of the shaft 40 to increase from zero. Further upward movement of cam 77 causes the arm 51 to be moved downwardly through its number 2 position, thence to its number 3 position, at which point the follower roll 87 is at the low point of cam path 88 and the reactor 58 is rotating in a reverse direction at maximum speed. It is at this point that, due to the reduction gearing 69, 70, 72 and 73, shaft 40 has increased in speed from zero through its low speed range, and reactor 60 is conditioned to take over for the high speed range of operation of shaft 40. The arrangement is such that arm 66 is rotating at a speed slightly greater than that of shaft 40 so that clutch 74 can be shifted without tooth-on-tooth contact. Shifting of clutch 74 at the proper time is accomplished by a valve 89 having a valve stem 90 connected to the cam 77. When cam 77 is at a position in its upward travel such that the roll 87 is at the low point of cam surface 88, the head 91 of stem 90 establishes communication between lines 92 and 93, whereupon piston device 94 shifts clutch 74 into engagement with arm 75. Immediately, the faster rotating arm 75 takes over from the gear 73 because of the overriding clutch 73'.

Further upward movement of the cam 77 causes the roller 87 and valve 78 to move clockwise about pivot 86, thereby forcing spool 79 rightwardly, establishing communication between lines 84 and exhaust line 83, while still retaining line 82 blocked off. Accordingly, piston 76 begins to raise due to the pressure liquid in line 85 until cam 81 permits spool 79 to move leftwardly enough to close off exhaust line 83. This action of moving cam 77 upwardly may continue until arm 51 has returned to its number 1 position when shaft 40 is rotating at its maximum rate of speed.

Movement of the cam 77 downwardly from its uppermost position causes the shaft 40 to reduce in speed to zero when cam follower or roll 87 is in the position shown in FIG. 1.

The reciprocation of the cam 77 during a metal removal operation of head 25 preferably should be related to the speed at which the table 10 is rotated by the conventional variable speed transmission 12'. During traverse movement of head 25, the movement of cam 77 should preferably be unrelated to the rotation of table 10. In the present embodiment, the function of relating head movement to table rotation has been accomplished by employing a servo drive 95 between the gear 38 and an auxiliary variable speed device 96 that is driven from the transmission 12' that drives the table 10. The servo drive 95 is in the form of an epicyclic gearing train.

The output shaft of the conventional variable speed transmission 12' drives a gear train 97 that in turn drives a shaft 98. The shaft 98 is connected to a shaft 99 that drives a shaft 100 through bevel gears 101 and 102. A flat disk 103 is fixed to shaft 100, and it frictionally drives a disk 104 that is fixed to a reciprocable shaft 105 having a square or splined cross section. With disk 104 in its solid line position at the center of disk 103, shaft 105 does not rotate. Movement of disk 104 towards its dot-and-dash position increases the speed of rotation of shaft 105 from zero to a maximum predetermined value.

The speed of rotation of shaft 105 is employed to drive, through bevel gearing 106, a sun gear 107 of the epicyclic gearing arrangement 95. The sun gear 107 meshes with planet gears 108 which in turn mesh with the internal teeth of a ring gear 109. The external teeth of ring gear 109 mesh with gear 38 that is driven from the output shaft 40 of the variable speed unit VS. The planets 108 are journaled in an arm 110 that drives through gear teeth 111 thereon, a gear train 112 including a hydraulically operable clutch 113. When the clutch 113 is effective, gearing 112 drives a shaft 114 to which is fixed a pinion 115 in mesh with a rack 116 integral with the cam 77.

With the parts in the condition shown in FIG. 1, the gear 38 is not rotating, nor is shaft 105. Movement of disk 104 off its center position causes shaft 105 to rotate at a predetermined speed depending upon the distance that disk 104 is moved from center. Since gear 38 is not rotating, the rotation of sun gear 107 rotates arm 110 and hence shaft 114, provided, of course, that clutch 113 is effective. Rotation of shaft 114 may move cam 77 upwardly, thereby effecting the movement of lever 51 from its number 1 toward its number 2 position and hence starting the rotation of gear 38. When the speed of rotation of gear 38 arrives at a predetermined value, it will combine with the speed of rotation of the sun gear 107 and stop the rotation of arm 110. This, of course, stops the movement of cam 77 and also the movement of lever 51. By properly calibrating the offset positions of disk 104 with respect to the speeds of rotation of gear 38, such positions can represent definite feed rates of movement of the head 25, each of which rates will be definitely related to the speed of rotation of the table 10.

Reciprocation of shaft 105 may be effected by connecting it to an oscillatable member 117 through a connecting rod 118 and a non-rotatable connector 119 that permits rotation of shaft 105. The member 117 may be provided with bevel gear teeth 120 that mesh with a bevel pinion 121 on a shaft 122 to which is fixed a knob 123 and a dial 124. The dial 124 may be marked to indicate the feed rates corresponding to the calibrated offset positions of disk 104.

From the foregoing it is evident that setting of dial 124 will cause head 25 to move at a predetermined feed rate related to the rotation of the table 10 when the clutch 113 is rendered effective.

Referring to FIG. 3, a reversing electric motor 125 may have a worm 126 fixed to its output shaft which meshes with a worm gear 127 fixed to a shaft 128 that is drivingly connected to the gear segment 117. Contacts 129 and 130 (FIG. 10) may be provided for energizing motor 125 in a forward or a reverse direction. These contacts 129 and 130 may be mounted in any convenient place so that the operator may view the dial 124 when either of the switches 129 and 130 is closed. When the desired feed rate has been reached, as evidenced by the reading of the dial 124, the contact 129 or 130 is released.

As previously explained, movement of the head 25 at traverse rates of speed preferably should not be related to the rotation of the table 10. In the embodiment disclosed, this has been accomplished by providing a separate power operated drive for moving the cam 77 independently of the epicyclic control gearing 95. Referring to FIGS. 1, 2 and 3, a member 131 may be fixed to the cam 77 and it may make a telescopic connection with a rod 132. The rod 132 may be threadingly connected to a nut 133 which is pivotally mounted on a lever 134 which latter is pivotally mounted at 135. The threaded rod 132 may include a square end 136 to receive a wrench.

Referring again to FIG. 1, the constant pressure inlet 92 of valve 89 may include a passage 137 that causes the constant pressure liquid to act on the head 91 of the stem 90 constantly urging cam 77 and rod 132 downwardly. The downward extent of movement of the rod 132 is determined by a piston 138 (FIG. 3A) that is urged upwardly into a predetermined position by a spring 139 within a cylinder 140.

From the foregoing it is evident that adjustment of the rod 132 can be made to produce a limiting downward position of the cam 77 to provide a predetermined "creep" speed of movement for the head 25. This "creep" speed is effective to cause gear 38 to rotate continuously, but it is ineffective to move the head 25 until one of the clutches 34 and 35 is engaged as will be explained later. When any feed movement of head 25 is initiated, liquid pressure in a line 141 leading to the cylinder 140 withdraws piston 138 from its upper limiting position. This makes it possible to have a feed rate that is less than the predetermined "creep" rate. Additionally, a branch 141a of line 141 leads to clutch 113.

Referring again to FIG. 2, the cam 77 may be provided with an abutment 142 adapted to be engaged by a finger 143 fixed to a shaft 144. The shaft 144 may also support in fixed relation thereto another finger 145 having a cam follower 146 thereon. The follower 146 may engage the peripheral surface of a cam 147 that is fixed to a shaft 148. The constant pressure acting on valve stem 90 (FIG. 1) forcing cam 77 downwardly causes follower 146 (FIG. 2) to remain in contact with the surface of cam 147. Shaft 148 may be geared to a cam shaft 149 through bevel gearing 150, and cam shaft 149 may be driven by a reversible electric motor 151 through a gear reduction 152. Cams 153, 154 and 155 may be fixed to cam shaft 149 for actuating contacts 156, 157 and 158 for a purpose to be described later.

Referring to FIGS. 1 and 5, solenoid operated valves 159, 160, 161, 162 and 163 may be provided for actuating the clutches 34, 35, piston 138 and clutch 113. A common fluid supply line 164 may supply all of the valves 159 to 163. An outlet line 165 from valve 159 is connected to clutch 35 such that when effective, gear 33 is clutched to shaft 20. A line 166 connects valve 160 to clutch 35 such that when effective, gear 32 is clutched to shaft 20. An outlet line 167 connects valve 161 to clutch 34 such that when effective, gear 31 is clutched to screw 17. A line 168 connects valve 162 to clutch 34 such that when effective, gear 30 is clutched to screw 17. Solenoids 169 to 173, inclusive, may be provided for the valves 159 to 163, respectively.

Referring to FIG. 8, a diagram is shown which discloses in block form various components of the control for the apparatus. A tape reader 174 may be of conventional design for receiving conventional tape 174' punched with command data for controlling the machine. The punched data on conventional tape may be arranged in blocks of information, each block usually containing all the data necessary for causing the machine to produce a function. Command information from reader 174 may cause the closing of various tape control contacts for selecting a feed rate by energizing the motor 125; selecting a direction of head movement by energizing a selected solenoid 169 to 172; effecting traverse movement of the tool head by energizing the motor 151; selecting a predetermined speed of rotation of table 10 by operating the variable speed transmission 12'; and indexing the turret 25. Command information may also provide a predetermined voltage on an electronic nulling circuit 175 or the like which preferably may comprise a relatively unsophisticated circuit, the resolution of which may be substantially less than more sophisticated circuits, and of substantially less cost than the latter. Since the majority of operations on a lathe can tolerate accuracies within about ±0.003 inch, the circuitry 175 need be of no greater accuracy, and may include potentiometer means 175′ and 175″ (FIG. 1) that are operated in response to the movement of the turret 25 along the cross rail 13 and saddle 16. When, however, greater accuracies are required than that obtainable with the circuitry 175, the movable head may operate under the control of the circuitry 175 to within an inch of the accurate point desired, and the distance control is then taken over by a "fine" distance control 176 which may include a series of disks having dogs which can be preset to very great accuracies.

When either of the circuits 175 or 176 completes its function, it causes a tape indexing circuit 177 to cause the tape within the reader 174 to be indexed to its next succeeding block of command information.

The electronic circuitry for the coarse distance control may be of the potentiometer bridge type or the like, or it may be similar to the systems sold by the General Electric Company under the name of the "Mark" systems, the latter being modified to a less sophisticated circuit than those known as the "Mark I" and "Mark II" systems.

The fine distance control 176 may comprise a series of disks 178 separated by spacer disks 179 (FIG. 6). The extension of shaft 26 (FIG. 1) may be fixed to a bevel pinion 180 that meshes with another bevel pinion 181 fixed to a shaft 182 suitably mounted for rotation. Sleeves 183 and 184 may be pinned to shaft 182, and a hollow cylindrical member 185 may extend between the sleeves 183 and 184 and pinned thereto. The member 185 may be externally splined for receiving interiorly splined spacer disks 179. The control disks 178 may have a cylindrical hole 186 therein, the wall of which rides on the top of the splined teeth on cylindrical member 185. A disk 187 may be fixed to the one end of member 185, and it may have a series of pins 188 surrounding it, and on which compression springs 189 may be mounted. The springs act between the disk 187 and the first spacer disk 179 of the series of disks 178, 179. This acts to force all of the disks 178, 179 toward the opposite end of member 185 against a disk 190 fixed to the end of member 185 opposite that supporting disk 187. Each disk 178 is provided with a permanent land or dog 191 in line with a corresponding switch 192. Since it is desirable to locate the disks 178 and 179 as closely as possible, alternate switches 192 are arranged in staggered spaced relation. Each disk 178 may also be provided with spaced notches 193 about its periphery for cooperation with a tool that is employed to adjustably move such disks.

From the foregoing it is evident that all of the disks 178 are frictionally held against rotation relative to the member 185 by the action of springs 189 forcing them into frictional engagement with spacer disks 179, which latter spacer disks are prevented from rotating relative to member 185 by the intermeshing splined construction between them. Furthermore, it is evident that each disk 178 may be turned independently of every other disk 178 by applying, through a tool, a torque thereto that overcomes the friction between it and the adjacent spacer disks 179.

The thread of the screw 17 may be constructed with a half inch pitch, and the ratio of gearing 180, 181 may be 1:2. Accordingly, 0.001″ movement of head 25 would represent about 0.012″ of peripheral movement of disks 178 if the latter are about four inches in diameter. A pointer 194 may be slidingly mounted on a rod 195 for facilitating the presetting of the disks 178.

Another series of disks 178, identical with those geared to shaft 26, may be geared to shaft 27 for controlling accurate positions of head 25 along a vertical axis.

The switches 192 corresponding to each disk 178 of both series are wired in series parallel with a relay which when energized effects the disengagement of the clutches 34 and 35 to stop the movement of the head 25.

Referring to FIG. 9, a simple program of movements of head 25 is shown and will be described to better illustrate the principles of the present invention. Assume the cutting edge of a tool on head 25 is desired to be moved from a point A leftwardly to a point B at 12.345″±.0005″ from the center of table 10; thence at a feed rate of 0.015″ per revolution of table 10 downwardly a relatively coarse distance 1.500″±.003″ to point C; thence at a fast traverse rate rightwardly to a point D 15.000″±.0005″; thence downwardly at a slow traverse rate another relatively coarse distance 0.750″±.003″ to a point E.

Since the point B is a critical dimension, a disk 178 of the series connected to threaded shaft 17 through shaft 26 will be employed to finally stop the head 25 so that the cutting edge of the tool is at point B.

Figure 10:
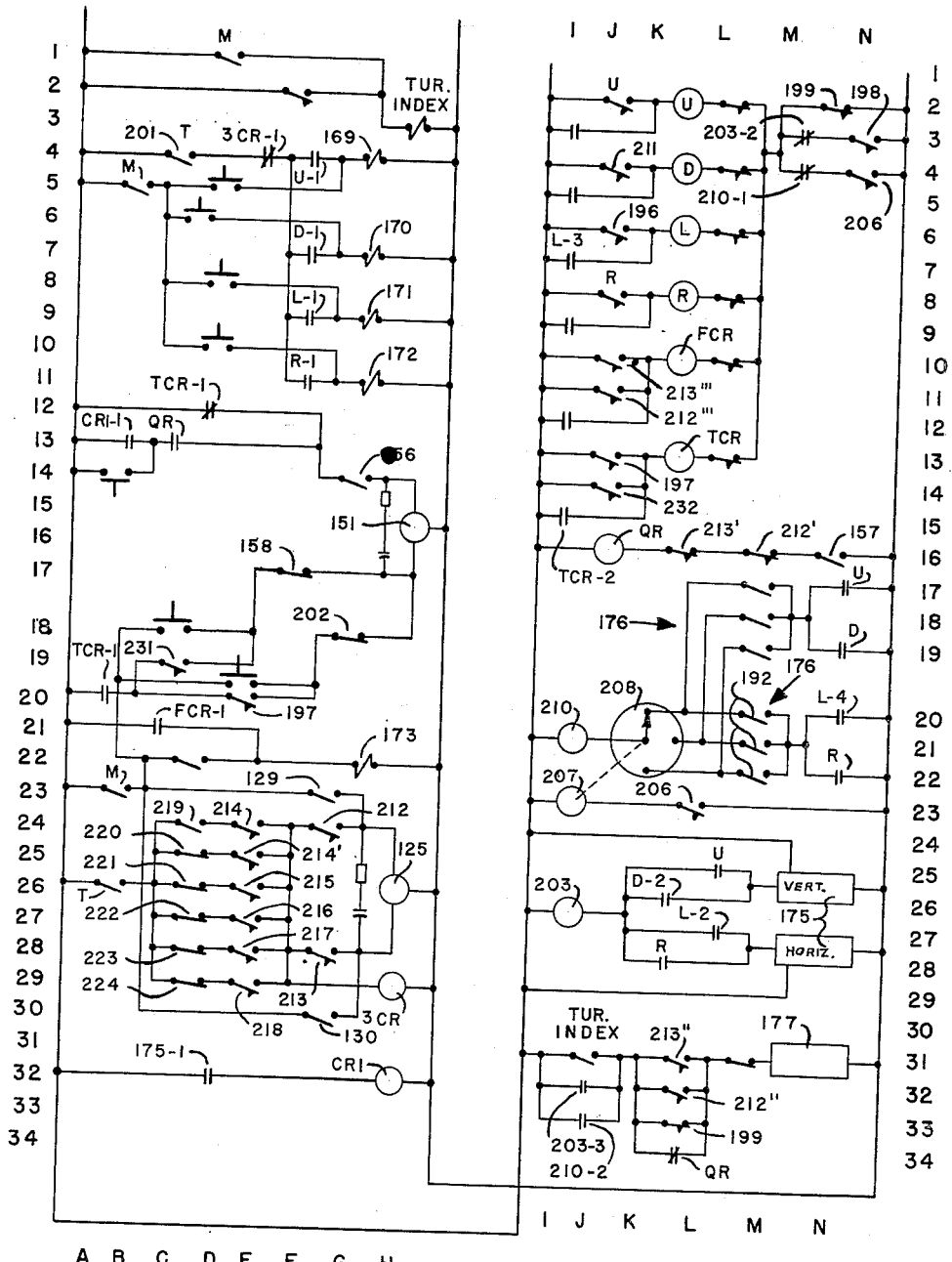
FIG. 10 is a wiring diagram for the apparatus shown in FIGS. 1 to 9.

The following description which will refer to FIG. 10 will describe tape-operated contacts which will be identified by a numeral preceded by a letter "t," and the numerals and letters in parentheses will refer to the coordinates on FIG. 10. All tape controlled contacts are shown in FIG. 10 with a triangular lobe thereon.

The first block of data on the tape that is read by the tape reader 174 will have a hole for closing t-contact 196(6,J); a hole for closing t-contacts 197(20,E and 13,J); fast traverse; a hole for closing t-contact 198(3,N); and holes for numerical data corresponding to a position close to the precise stopping point B, say 12.200 inches from the center of table 10, for a reason to be explained later.

Closing t-contact 196(6,J) energizes relay coil L(6,K) since t-contact 199(2,N) is normally closed. Energizing relay coil L closes contacts L–N(9,F), thereby energizing solenoid 171(9,G) since switch 201(4,C) was manually closed for tape operation. Energizing of solenoid 171 actuates valve 161 (FIG. 5) to cause liquid to flow through line 167, operating clutch 34 to connect gear 31 to screw 17, thereby causing head 25 to move leftwardly.

Closing t-contact 197(13,J) energizes relay coil TCR(13,K). Accordingly, TCR–1 contacts (20,A) close and TCR–1 contacts (12,D) open. With TCR–1 contacts (20,A) closed and t-contact 197(20,E) closed, motor 151(15,H) is caused to rotate in a forward direction (FIG. 2). Referring to FIG. 4, this immediately causes cam 153 to close contacts 156 (also see FIG. 10; 14,F); however, the TCR–1 contacts (12,D) are open and closing of contacts 156 does not complete a circuit. As cam 154 closes contacts 157(16,N), relay QR(16,J) is energized, closing contacts QR(13,C) but since contacts CR1–1 are open, no circuit is established to motor 151. As cam 155 opens contact 158, of course nothing happens since no circuit is established. Accordingly, motor 151 continues to rotate cam 147 (FIG. 2) until contacts 202(18,G) are opened when motor 151 stops. This has caused shaft 144 to rotate to a point where lever 143 has moved cam 77 to its uppermost position at which lever 51 has moved from its number 1 position to its number 3 position and back to its number 1 position. Accordingly, the head 25 traverses leftwardly at fast traverse speed.

The closing of t-contact 198(3,N) has no significance since normally closed t-contact 199(2,M) has not been opened for a reason to be described later. The energizing of relay coil L(6,K) not only closes L–1 contacts (10,F) but also closes L–2 contacts (27,M). This energizes horizontal distance control 175(28,N) which, as previously explained, may be any type of electronic distance determining means in which an unbalanced condition is set up by the numerical data in the first block of tape information representing 12.200″. As the head 25 moves leftwardly, approaching the 12.200″ mark, the error sensing means of the horizontal distance control 175 moves toward a null condition. However, adjustable means within the horizontal unit 175 effects the closing of normally open contacts 175–1(31,D) when the tool head is within about one inch from null condition of the horizontal detector circuit. Closing contacts 175–1(31,D) energizes relay CR1(32,H), which in turn closes CR1–1 contacts (13,B). Since QR contacts (13,C) and contacts 156 are closed, motor 151 rotates in a reverse direction, thereby decreasing the speed of movement of the tool head until it reaches about one inch per minute when contacts 157 open by the action of cam 154, thereby de-energizing QR relay (16,J) hence opening QR contacts (13,C) stopping motor 151. The adjustable nature of the means within 175(27,N) for closing contacts 175–1(31,D) makes it possible to have the head moving at about one inch per minute at point 12.200″. When the head is at point 12.200″, null will be established and current will flow through the horizontal unit 175, the closed contacts L–2(27,L), thereby energizing relay coil 203(27,I).

Energizing coil 203(27,J) opens contacts 203–2(3,M) but since t-contact 199(2,M) is closed, the opening of contacts 203–2 has no significance at this point. Energizing of coil 203(27,J) also closes contacts 203–3(32,J), thereby establishing a circuit through closed QR contacts and tape indexing device 177(31,N); see also FIG. 8. The tape is immediately indexed to its next block of information. However, the head 25 continues to move at one inch per minute leftwardly from the 12.200″ point since coil L(6,K) remains energized through holding contacts L–3(7,I). Due to tape indexing, CR1 relay (32,H) is de-energized, opening contacts CR1–1(13,A). The tape index requires only a fraction of a second to establish the next functional operation of the system.

This new block of tape information includes a hole which will open t-contacts 199(2,N, and 33,L); a hole for t-contacts 206(23,L, and 4,N); and no holes for numerical data. Closing t-contact 206(23,L) energizes relay coil 207(23,I), thereby indexing stepping switch 208(21,K) to set up a circuit including one of the disks 178 and a corresponding normally open contact 192(20,M) of the horizontal detector disks 178 (see FIG. 6). There may be any number of these disks 178 and corresponding contacts 192, three only of the thirty shown in FIG. 6 being shown in FIG. 10. The selected disk 178 may be preset to cause the corresponding contact 192 to close when head 25 arrives at the desired location B (FIG. 9). It will be remembered that head 25 is still moving at one inch per minute leftwardly because coil L(6,K) is still energized, which has held contacts L–4(20,N) closed, and the speed remains at one inch per minute because TCR–1 contacts (12,D) are open since TCR relay (13,K) is held energized by holding contacts TCR–2 (15,I). Switch 156(14,G), however, is closed as previously explained. Accordingly, when the dog on the selected disk 178 closes its contact 192, relay coil 210(21,I) is energized. It will also be remembered that t-contact 206(4,N) was closed by the tape data, and that t-contact 199(2,N) was opened. It is evident, therefore, that relay L(6,K) is now held energized only by t-contact 206(4,N) and normally closed contacts 210–1(4,M). Accordingly, when relay 210(20,I) is energized, contacts 210–1(4,M) open, thereby de-energizing coil L(6,K), hence opening L–1 contacts (9,F), de-energizing solenoid 171(8,G) and stopping head 25 at point B. Furthermore, when contacts 210–1(4,M) open, TCR relay (13,K) de-energizes, closing contacts TCR–1(12,D), thereby rotating motor 151(15,H) in a reverse direction until cam 153 opens switch 156(13,G, and FIG. 4), whereupon the motor 151 stops with the cam 77 in position for zero speed or a creep speed, depending upon the adjustment of 136 (FIG. 3A).

Since QR relay (16,J) has been de-energized, contacts QR(34,L) are closed and t-contact 199(33,L) has been opened by the tape. Therefore, when contacts 210–2(32,J) close upon the energization of the relay 210(21,I), the tape indexing device 177(31,N) advances the tape to the next block of data.

Referring again to FIG. 9, movement of head 25 from point B to point C is to be at a feeding rate of 0.015″ per revolution of table 10, and point C is not a critical distance from point B, being 1.500″±.003″ below point B. Accordingly, the next succeeding block of tape data will include a hole for closing t-contact 211(4,J); one for closing t-contacts 212(24,G), 212″–(32,L), 212‴(12,J) and opening 212′(16,M); or closing t-contacts 213(28,G), 213″(31,L), 213‴(11,J) and opening 213′(16,K), depending upon whether the feed rate 0.015″ per revolution is greater or less than the last preceding selected one, which in the illustration is zero and, therefore, contacts 212, 212″, 212‴ will be closed and 212′ will be opened by the tape. Also included in said succeeding block of tape will be a hole for closing one of the t-contacts 213 to 218(24–29,D) corresponding to the feed rate of 0.015″ per revolution of table 10; a hole for opening t-contacts 199(2,M) and (33,L); a hole for closing t-contact 198(3,N); and holes for numerical data corresponding to the extent of downward feed. Since point C is not a critical dimension, only the vertical detector unit 175(25,N) will be employed to stop the head movement.

Closing t-contacts 211(4,J) and 198(3,N) energizes relay coil D(4,K), thereby closing contacts D–1(7,F) and D–2 contacts (26,L); the closing of the former would energize solenoid 170(7,G; see also FIG. 5), except that contacts 3CR–1(4,E) are open as will be explained. Energizing solenoid 170 operates valve 160 to cause clutch 35 to connect gear 32 to shaft 20.

Referring to FIG. 10, there are six sets of t-contacts 213 to 218, inclusive, each in series with a corresponding contact 219 to 224 (see also FIG. 3), which latter are controlled by a corresponding cam 225 to 230. The cams 225 to 230 are adjustably mounted on an extention of shaft 128, and when each opens its corresponding contact 219 to 224, with the corresponding t-contact 213 to 218 closed, motor 125 is stopped and disk 104 (FIG. 1) is positioned relative to disk 103 to cause the planetary 95 to have moved cam 77 to a position which locates lever 51 such that a predetermined feed rate is established.

Assume t-contact 214(25,D) is the one that provides 0.015″ per revolution feed of head 25, and that the cam switch 219(24,C) is open so that motor 125 has been previously stopped at a feed rate less than 0.015″ per revolution.

Closing t-contact 214(25,D) sets up a circuit to energize motor 125 to rotate in a direction to increase feed rates of head 25, and at the same time energizes a time delay relay 3CR(29,H) through t-contact 214(25,D) and a contact 231 which was manually closed for tape control. Energizing motor 125 causes it to rotate until cam 226 (FIG. 3) opens contact 220, whereupon motor 125 stops. This rotation of motor 125 has operated member 117 to move disk 104 relative to disk 103 to provide a feed rate of 0.015″ per revolution of head 25. Energizing 3CR relay opens contacts 3CR–1(4,E) for a purpose to be described. Closing of t-contact 212‴(12,J) energizes FCR relay (10,K) which closes FCR–1 contacts (21,A), thereby energizing solenoid 173 to cause the adjustment of planetary 95 to set cam 77 for a feed rate of 0.015″ per revolution. However, since 3CR–1 contacts (4,E) are open due to energizing of time delay relay 3CR(29,H), solenoid 170(7,G) is not energized, and therefore head 25 does not move. After a predetermined interval of time sufficient to cause the planetary 95 to have adjusted cam 77 for the feed rate of 0.015″ per revolution, 3CR relay (29,H) de-energizes, closing 3CR-1 contacts (4,E) and head 25 begins to feed downwardly at 0.015″ per revolution. When the head arrives at point C, the vertical detector unit 175(25,N) will null, causing current to flow through it, D-2 contacts (26,L) and relay 203, energizing the latter. This causes contacts 203-2(3,M) to open and contacts 203-3(33,J) to close. Opening contacts 203-2 de-energizes L relay (6,L), thereby stopping the head movement. Closing contacts 203-3(33,J) causes indexing mechanism 177(31,N) to index the tape to the next succeeding block.

The next block of information on the tape will contain data to cause the head 25 to move rightwardly to point D and ultimate distance of 15.000″ from the center of the table in the same way that head 25 was moved from point A to point B.

Finally, the head 25 is to be moved downwardly to a point E that is 0.750″±.003″ below point D at a traverse rate. Since this distance is too short to get fast traverse into and out of engagement, a slow traverse rate will be employed. Furthermore, since point E is not critical, only the vertical detector unit 175(25,N) will be employed to stop the head movement. Accordingly, the next succeeding block of information on the tape will include a hole for closing the t-contact 211(4,J); one for closing t-contacts 231(19,D) and 232(14,J); one for opening t-contacts 199(2,N) and (33,L); a hole for closing t-contact 198(3,N); and holes for providing numerical data to effect stopping of head 25 at the correct position.

Closing t-contact 211(4,J) energizes D relay coil (4,K) through t-contact 198(3,N). Energizing coil D closes D-1 contacts (7,F) and the D-2 contacts (26,L). Closing the latter sets up the circuit for vertical distance detector 175(25,N), but no current flows through it because it is not at null condition. Closing D-1 contacts (7,F) energizes the solenoid 170, effecting engagement of gear 32 to shaft 20 as explained before.

Closing t-contact 232(14,J) energizes TCR relay (13,K) which closes TCR-1 contacts (20,A). Closing t-contact 231(19,C) energizes motor 151 to rotate in a forward direction, increasing the speed of movement of head 25 until it reaches 0.9″ per minute when the cam 155 (FIG. 4) opens contacts 158. The head 25 continues to move at 0.9″ per minute until the circuit for the vertical unit 175(25,N) is nulled when head 25 has reached the point E. Nulling of this circuit energizes relay 203(27,J); energizing relay 203 closes contacts 203-1(31,D), thereby energizing coil CR1 which then closes CR1-1 contacts (13,B). However, since the head 25 is moving at 0.9″ per minute, contacts QR(13,C) are open and nothing happens in this circuit. Energizing relay 203 also opens contacts 203-2(3,M) which de-energizes D relay (4,K) and TCR relay (13,K). De-energizing TCR relay closes TCR-1 contacts (12,D), thereby reversely rotating motor 151 until cam 153 opens contacts 156(14,G) when the apparatus is stopped.

The apparatus may be operated manually by closing contacts M(5,B, and 23,B) and opening contacts T(4,C, and 26,B). Push button switches may be suitably provided for manually controlling the energizing of solenoids 169, 170, 171 and 172. Also push button contacts may be provided for operating motor 151 to provide fast traverse, slow traverse and re-set of motor 151.

Furthermore, contacts 129(23,F) and 130(30,F) may be employed to manually set any desired feed rate as predetermined by cams 225 to 230 (FIG. 3).

Although the various features of the new and improved tape control have been shown and described in detail to fully disclose one embodiment of the invention, it will be evident that changes may be made in such details and certain features may be used without others without departing from the principles of the invention.

What is claimed is:

1. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means, each adapted to determine the extent of a movement of said member along said path; means responsive to said programming means for successively rendering effective said mechanically adjustable means; and means responsive to the member arriving at the point along its path of travel to which it is to be moved for rendering effective said step-by-step means.

2. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means adapted to supplement said electronic distance determining means responsive to said programming means for successively rendering effective said mechanically adjustable means; and means responsive to the member arriving at the point along its path of travel to which it is to be moved for rendering effective said step-by-step means.

3. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage, said electronic distance determining means being effective over the entire path of travel of said member; a plurality of mechanically adjustable means, each adapted to determine the extent of a movement of said member along said path, said mechanically adjustable means being effective over only an incremental portion of the entire path of travel of said member; means responsive to said programming means for successively rendering effective said mechanically adjustable means; and means responsive to the member arriving at the point along its path of travel to which it is to be moved for rendering effective said step-by-step means.

4. Apparatus comprising in combination, a member; means for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of separately adjustable disks, each being adapted to be preset for rendering ineffective said member moving means; means for rotating said disks in proportion to the movement of said member; means on said programming means for successively rendering effective said disks; and means responsive to the member arriving at the point along its path of travel to which it is to be moved for rendering effective said step-by-step means.

5. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means responsive to data on said tape and the movement of said member for determining a distance said member moves along its path of motion; and means responsive to said member moving throughout said predetermined distance along its path of motion for rendering effective said indexing means.

6. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means adapted to supplement said electronic distance determining means and responsive to data on said tape and the movement of said member for determining a distance said member moves along its path of motion; and means responsive to said member moving throughout said predetermined distance along its path of motion for rendering effective said indexing means.

7. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion, said electronic means being effective over the entire path of travel of said member; mechanically adjustable means responsive to data on said tape and the movement of said member for determining a distance said member moves along its path of motion, said mechanically adjustable means being effective over only an incremental portion of the entire path of travel of said member; and means responsive to said member moving throughout said predetermined distance along its path of motion for rendering effective said indexing means.

8. Apparatus comprising in combination, a member; means for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; a plurality of separately adjustable disks, each being adapted to be preset for rendering ineffective said member moving means; means for rotating said disks in proportion to the movement of said member; means on said tape means for successively rendering said disks effective; and means responsive to said member moving throughout said predetermined distance along its path of motion for rendering effective said indexing means.

9. Apparatus comprising in combination, a member; a steplessly variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means, each adapted to determine the extent of a movement of said member along said path; means responsive to said programming means for successively rendering effective said mechanically adjustable means; and means responsive to the member arriving at the point along its path of travel to which it is to be moved for rendering effective said step-by-step means.

10. Apparatus comprising in combination, a member; a steplessly variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of mechanically adjustable means adapted to supplement said electronic distance determining means responsive to said programming means for successively rendering effective said mechanically adjustable means; and means responsive to the member arriving at the point along its path of travel to which it is to be moved for rendering effective said step-by-step means.

11. Apparatus comprising in combination, a member; a steplessly variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage, said electronic distance determining means being effective over the entire path of travel of said member; a plurality of mechanically adjustable means, each adapted to determine the extent of a movement of said member along said path, said mechanically adjustable means being effective over only an incremental portion of the entire path of travel of said member; means responsive to said programming means for successively rendering effective said mechanically adjustable means; and means responsive to the member arriving at the point along its path of travel to which it is to be moved for rendering effective said step-of-step means.

12. Apparatus comprising in combination, a member; a steplessly variable speed transmission for moving said member in either direction along a plurality of paths of movement; programming means including a plurality of portions, each adapted to contain command data for effecting the selection of the path, rate and extent of movement of said member along said path; means for causing the portions of said programming means successively to be rendered effective in a step-by-step fashion; an electronic distance determining means including an electronic circuit adapted to cooperate with said member and said programming means for producing an error signal voltage representing the distance between the member and a point along its path of movement to which it is to be moved; means within said electronic circuit responsive to the movement of the member for nulling said error signal voltage; a plurality of separately adjustable disks, each being adapted to be preset for rendering ineffective said member moving means; means for rotating said disks in proportion to the movement of said member; means on said programming means for successively rendering effective said disks; and means responsive to the member arriving at the point along its path of travel to which it is to be moved for rendering effective said step-by-step means.

13. Apparatus comprising in combination, a member; a steplessly variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means responsive to data on said tape and the movement of said member for determining a distance said member moves along its path of motion; and means responsive to said member moving throughout said predetermined distance along its path of motion for rendering effective said indexing means.

14. Apparatus comprising in combination, a member; a steplessly variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; mechanically adjustable means adapted to supplement said electronic distance determining means and responsive to data on said tape and the movement of said member for determining a distance said member moves along its path of motion; and means responsive to said member moving throughout said predetermined distance along its path of motion for rendering effective said indexing means.

15. Apparatus comprising in combination, a member; a steplessly variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion, said electronic means being effective over the entire path of travel of said member; mechanically adjustable means responsive to data on said tape and the movement of said member for determining a distance said member moves along its path of motion, said mechanically adjustable means being effective over only an incremental portion of the entire path of travel of said member; and means responsive to said member moving throughout said predetermined distance along its path of motion for rendering effective said indexing means.

16. Apparatus comprising in combination, a member; a steplessly variable speed transmission for moving said member in either direction along a plurality of paths of movement; programming means including tape means having blocks of command data thereon for selecting the path, speed and extent of movement of said member along said path; means for indexing said tape in a step-by-step fashion; electronic distance determining means responsive to command data on said tape means and the movement of said member for determining the distance said member moves along its path of motion; a plurality of separately adjustable disks, each being adapted to be preset for rendering ineffective said member moving means; means for rotating said disks in proportion to the movement of said member; means on said tape means for successively rendering said disks effective; and means responsive to said member moving throughout said predetermined distance along its path of motion for rendering effective said indexing means.

References Cited in the file of this patent

UNITED STATES PATENTS

| | | |
|---|---|---|
| 2,861,469 | Kintzing | Nov. 25, 1958 |
| 2,901,927 | Morgan | Sept. 1, 1959 |
| 2,916,931 | Cunningham | Dec. 15, 1959 |